United States Patent Office 2,969,571
Patented Jan. 31, 1961

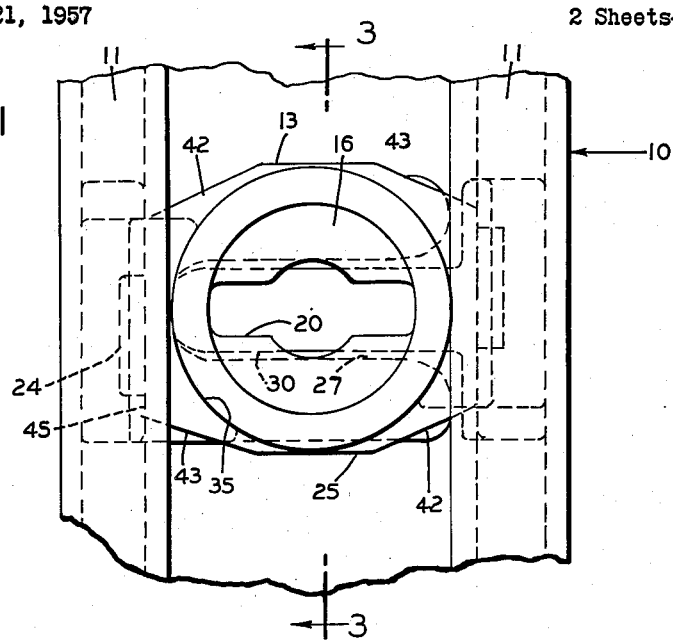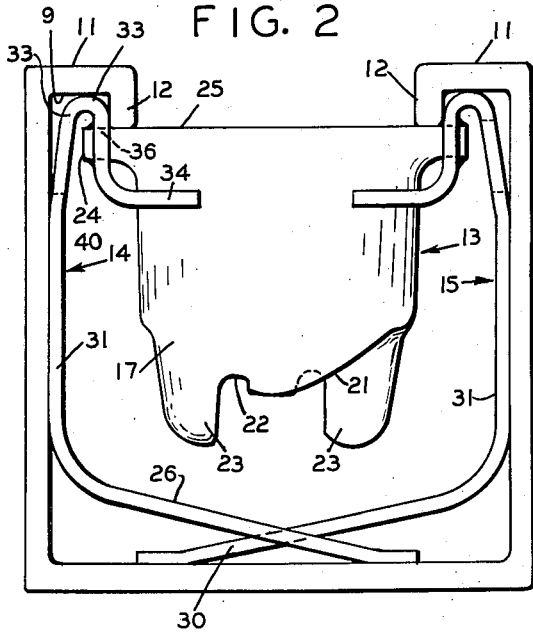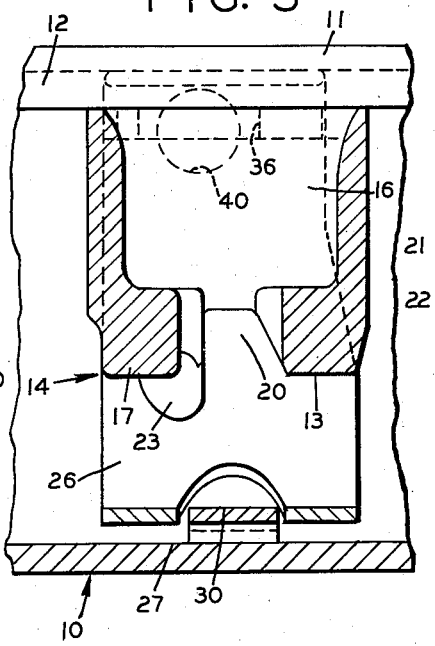

2,969,571

ROTARY STUD RECEPTACLE FOR MOUNTING IN A CHANNEL

John L. Vander Sande and Warren C. Bross, Westwood, N.J., assignors to Camloc Fastener Corporation, Paramus, N.J., a corporation of New York Filed June 21, 1957, Ser. No. 667,183

8 Claims. (Cl. 24—73)

This invention relates to a special-purpose receptacle for use in quick-acting fastener installations and relates more particularly to a novel receptacle mounting means for fasteners used in channelled framework structures.

In many complex electronic devices and machines it is desirable to mount many units of various sizes and shapes on a readily accessible supporting structure and also to move these units from time to time, to remove them for replacement or repair and to alter the entire arrangement of parts to meet changing requirements.

A particularly useful mounting means consists in a readily assembled framework formed of special channels having opposed, inwardly facing flanges on their open sides. These channels, which are sold under a number of trademarks, including "Unistrut" and "Powerstrut" come in standard lengths, having predrilled holes of convenient spacing and can be cut to desired length and quickly bolted together to suit a particular need.

Means for fastening the units to the structure generally comprise a special nut provided with a coil spring carried on its rear face to urge the nut against the flanges of the open channel. During installation the nut is frequently tilted on its side due to the instability of the coil spring as a column and it must then be set up straight again. This situation frequently occurs and is particularly troublesome on multiple fastener installations where the offending nut which tilts is one of the last to be engaged by the screw. This necessitates unfastening of the previously fastened elements and the removal of the unit in order to gain access to correctly reposition the nut in the channel. The advantages of a quarter turn, rotatable stud fastener as herein described in such installations is apparent. It is not necessary to seek a close fitting engagement between stud and receptacle as is required with a threaded nut-like element, and locking means are achieved without deformed threads which require the application of high torque. Also no special skill is required to apply the stud and rotate it to locked position.

An important object of the present invention is to provide novel means for mounting a receptacle for a fastener of the quick-acting, quarter turn type in a channel of this character, the mounting means consisting of a spring bracket received in the channel in such a manner as to overcome the above noted deficiencies and the receptacle being appropriately formed to be received by the bracket.

The resulting receptacle structure is easily placed in the channel with its major axis parallel with the edges of the channel opening, and then rotated clockwise into engagement with the opposed side walls of the channel, such rotation being resisted by appropriate spring pressure, and the structure is ready to receive the stud fasteners of the units to be mounted. When the unit is so mounted it cannot be moved longitudinally of the channel due to the locking forces of the fasteners, but when the unit is removed therefrom the receptacle can be readily moved by sliding it sideways in the channel.

The receptacle mounting means of the present invention has many uses in the electronics field wherein varying spacing of the units and quick replaceability is a highly important factor. It has many other uses as well in all cases where it is desired to mount many component parts on a skeletal framework and maintain the time saving characteristics of quarter turn fastening the devices.

Another object of the invention is to provide an improved spring mounted receptacle of the type described wherein the spring mounting bracket may be a separate member which is readily applied to the receptacle or the receptacle may itself be stamped from spring sheet metal and the bracket portions formed integrally therewith.

The inner edges of the inwardly facing flanges on the open side of the channel earlier referred to are themselves inwardly turned towards the interior of the channel, thus forming an internal groove on each side of the opening. An object of the present invention is to provide a receptacle structure including a spring mounting having portions which enter and interlock with said grooves. The spring mounting means is arranged to exert spring pressure on the opposed side walls of the channel and also on the interconnecting or base wall, thus firmly holding the interlock at the opposite side of the receptacle structure in said grooves.

In the drawings:

Fig. 1 is a broken plan view of a channel of the type described and showing one of the receptacle structures in place.

Fig. 2 is a side elevation of the receptacle in the channel.

Fig. 3 is a broken section taken on line 3—3 of Fig. 1.

Figure 4:
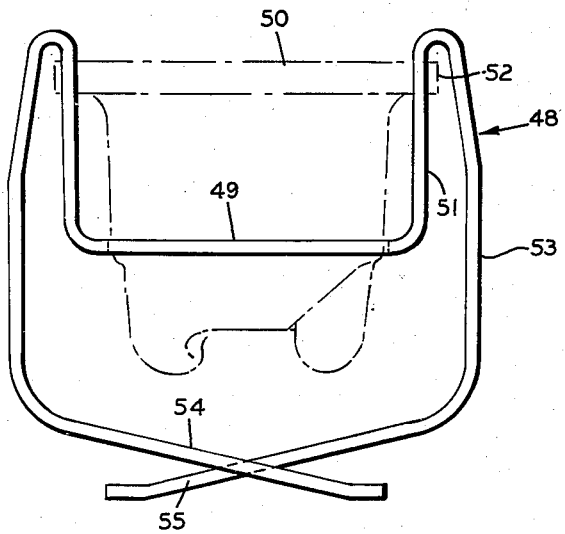
Fig. 4 is a side elevation showing a modified arrangement wherein the spring bracket is formed in one piece.

The channel for receiving and mounting the receptacle structure of the present invention is shown at 10 and it is provided on its open side with opposed flanges 11 lying on the plane of said open side and shallow inwardly turned flanges 12 forming internal grooves 9.

The receptacle structure includes a receptacle 13 and a pair of spring mounting brackets 14 and 15 stamped out from sheet metal which receive and support the receptacle and permit its movement longitudinally of the channel to a desired position.

The receptacle may be generally of the type used in any of the well-known quarter turn, quick-acting fasteners, one kind of which is shown in Patent No. 2,239,125. It is provided with a central bore 16 having a wall 17 at its inner end and provided with an opening 20 (Fig. 1) shaped to pass therethrough a stud with cross pin (not shown). At the lower end of the wall there are formed opposed helical ramps 21, detents 22 at the inner ends of the ramps to receive the cross pin when the fastener is in locked position, and stops 23 limiting further rotation of the cross pin.

This receptacle is largely conventional except that opposed ears 24 project outwardly from its outer or base wall 25.

Spring brackets 14 and 15 are identical except that the inner or base wall 26 of bracket 14 is bifurcated as shown at 27 to receive in non-binding engagement a central projection or tongue 30 forming the base wall of bracket 15. Each bracket is further formed with a side wall 31 which at its outer end is bent inwardly at 32 and then back upon itself to form a U-shaped section 33 and an inwardly extending terminal section 34 having a concavely curved inner edge 35 shaped to fit the outer periphery of the receptacle barrel. The U-shaped section 33 is received in interlocking relation in groove 9.

The inner leg of the U-shaped section has an opening 36 shaped to fit the ear 24 on the base of the receptacle and the inwardly inclined opposite leg has an opening 40 to receive a staking tool for the purpose of staking the ear to secure the bracket to the receptacle. Instead of the staking the ear may be brazed or spot welded to the bracket.

The upper wall 25 of the receptacle is substantially rectangular in shape except that the corner sections are cut away to form diagonal edges 42 and 43. More material is removed on edges 42 than on edges 43 for the following reason. It was earlier pointed out that the receptable structure is first placed in the channel with its main axis parallel with the opposed edges of the open channel and the structure is then rotated 90° to the position of Fig. 1.

This rotation is in a clockwise direction and the extent to which diametrically opposed corners 42 are relieved is greater to allow for this rotation. The smaller cut-away section provided by edges 43 forms a shoulder 45 which restrains clockwise rotation beyond the position of Fig. 1.

The stud used with a receptacle of the type shown enters the bore 16 in the receptacle more easily than does a screw in a nut of the type previously used and there is no danger of dislodging the receptacle or tipping it over when the parts are to be affixed in place on the channel.

The arrangement of Fig. 4 is substantially the same as that earlier described except that the spring bracket 48 is formed in one piece rather than in two pieces. When viewed from the side it resembles the structure of Fig. 2 except that a central ring-like portion 49 surrounds the receptacle 50 and the inner leg 51 of the bracket has an opening (not shown) to receive the ear 52 of the receptacle base.

The outer leg 53 has the same contour and one base portion 54 is bifurcated to receive the tongue 55 of the base portion.

Figure 5:
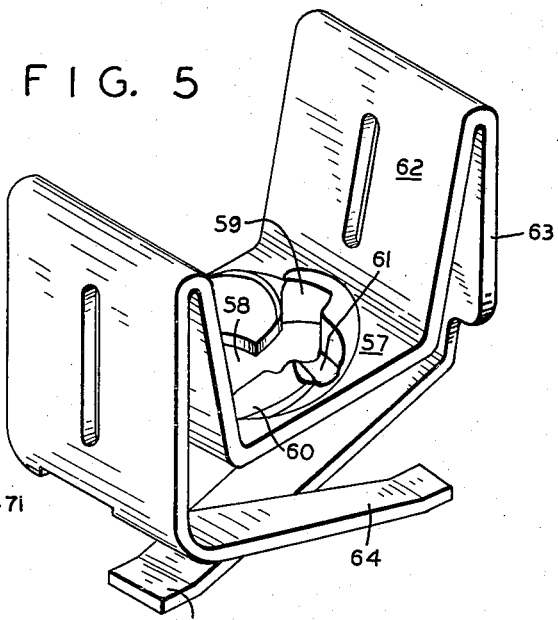
Fig. 5 is a perspective view of another modified form wherein the receptacle and spring bracket are formed in one piece from sheet metal.

In the modified structure of Fig. 5 the entire assembly is stamped in a single piece from sheet metal and has a central receptacle section 57 with a central opening 58 for the stud with lateral extension 59 for the cross-pin. It also has the helical ramps 60 for the latter and a detent 61. The opposed walls 62—63 are of inverted U-shape and one base section 64 is bifurcated and receives tongue 65 of the other base section.

Figure 6:
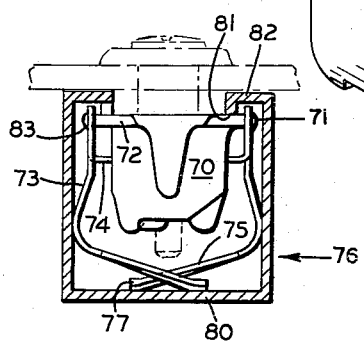
Fig. 6 is a section showing a further modification.

In the final arrangement of Fig. 6 the receptacle 70 is identical with that shown in Fig. 1 and the opposed ears 71 projecting outwardly from base wall 72 are received in openings (not shown) at the upper ends of spring brackets 73. The inverted U-shaped contour of the bracket is eliminated and so is the inwardly extending terminal section shown in Fig. 1 at 34. An inwardly struck tab 74 engages the side wall of the receptacle and the lower ends 75 of the brackets are bifurcated in order to provide clearance when the structure is rotated within channel 76 and the opposed side walls of the brackets must necessarily approach each other.

The lower terminals 77 of the brackets engage the inner wall 80 of the channel and urge the structure upwardly to cause base wall 72 of the receptacle to engage lip 81 of flange 82. Assembly of the spring brackets is more simple than in the structure of Fig. 1 where the tool swaging the receptacle insert to the springs has to enter hole 36 in the spring bracket in order to swage. In the instant case the terminal of the ear 71 is fully exposed and the terminal is upset or headed as shown at 83.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What we claim is:

1. A receptacle structure for mounting in movable relation in an open channel formed with inwardly extending flanges on its open side and arranged to receive a stud provided with a cross-pin element at its inner end, said structure including a receptacle having an opening shaped to pass the cross-pin element therethrough, and a spring bracket element supporting the receptacle on opposite sides thereof, base portions on the bracket having a cooperating tongue and slot and which urges the bracket outwardly of the channel, the opposite ends of the bracket being substantially of inverted U-shaped contour and having inwardly extending terminals which receive and support the receptacle.

2. A receptacle structure for mounting in movable relation in an open channel formed with inwardly extending flanges on its open side and arranged to receive a stud provided with a cross-pin element at its inner end, said structure including a receptacle provided at its outer end with a base portion and opposed ears extending outwardly from the base portion and having an opening shaped to pass the cross-pin element therethrough, and spring bracket elements supporting the receptacle on opposite sides thereof, base portions on the bracket elements having a cooperating tongue and slot to permit inward movement of the outer walls of the brackets as the structure is rotated within the channel, the opposite ends of the brackets being shaped to fit within the channel and having inwardly extending terminals which engage and support the receptacle, the inner walls of said U-shaped ends having openings to receive said ears.

3. A receptacle structure for mounting in movable relation in an open channel formed with inwardly extending flanges on its open side and arranged to receive a headed stud provided with a cross-pin element at its inner end, said structure being stamped in a single piece from spring sheet metal and including a central receptacle section having an opening shaped to pass the cross-pin element therethrough, and spring brackets carried at opposite ends thereof, base portions on the brackets having clearance means to permit inward movement of the opposed walls of the brackets as the structure is rotated within the channel.

4. A receptacle structure for mounting in movable relation in an open channel formed with inwardly extending flanges on its open side and arranged to receive a stud provided with a cross-pin element at its inner end, said structure including a receptacle having an opening shaped to pass the cross-pin element therethrough, fastening means to receive the cross-pin in locked position, and spring brackets carried at opposite ends of the receptacle, said brackets having openings to receive the ends of the receptacle in secured relation, the brackets engaging opposed walls of the channels and provided with base portions having clearance means to permit inward movement of said side walls of the brackets as the structure is rotated within the channel, said base portions urging the receptacle structure against the channel flanges.

5. A receptacle structure for mounting in movable relation in an open channel formed with inwardly extending flanges on its open side and arranged to receive a headed stud provided with a cross-pin element at its inner end, said structure including a receptacle having an opening shaped to pass the cross-pin element therethrough, ears formed at opposed ends of the receptacle, and spring brackets supporting the receptacle on opposite sides thereof, and having openings to receive the ears in secured relation, the brackets being inwardly movable and which engage the opposed walls of the channel and having base portions provided with clearance means to permit said inward movement of the brackets as the structure is rotated within the channel, said base portions also urging the structure outwardly into engagement with the channel flange.

6. A receptacle structure for mounting in movable relation in an open channel formed with inwardly extending flanges on its open side and arranged to receive a stud provided with a cross-pin element at its inner end, said structure including a receptacle provided at its outer end with a base portion and opposed ears extending outwardly from the base portion and having an opening shaped to pass the cross-pin element therethrough, and a pair of spring bracket elements supporting the receptacle on opposite sides thereof, overlapping base portions on the bracket elements and having clearance means therebetween to permit inward movement of the outer walls of the brackets as the structure is rotated within the channel, the opposite ends of the brackets being shaped to fit within the channel corner sections formed by said flanges and the opposed said walls of said channel and having curved, inwardly extending terminals which engage and support the receptacle, the inner walls of said terminals having openings to receive said ears.

7. A receptacle structure for a fastener for securing panels to an elongated open channel forming a structural framework and provided with inwardly extending flanges on its open side, said receptacle structure being movable longitudinally of the channel to an adjusted fixed position, said receptacle structure further being arranged to receive a stud provided with a cross-pin element at its inner end, said structure including a receptacle having an opening shaped to pass the cross-pin element therethrough and opposed helical ramps down which the cross-pin travels and detents to receive the cross-pin when the fastener is in locked position, and spring brackets carried at opposite sides of the receptacle and extending transversely of the open channel, said brackets having opposed walls, each one of said walls engaging one of the opposed walls of the channel, and base portions provided with clearance means to permit inward movement of said bracket side walls as the structure is rotated within the channel, said base portions urging the receptacle structure against the channel flanges and resisting rotation of the receptacle structure as the stud is rotated.

8. A receptacle structure for mounting in movable relation in an open channel formed with inwardly extending flanges on its open side and arranged to receive a stud provided with a cross-pin element at its inner end, said structure including a receptacle having an opening shaped to pass the cross-pin element therethrough, and a spring bracket element supporting the receptacle on opposite sides thereof, base portions on the bracket having a cooperating tongue and slot and which urges the bracket outwardly of the channel, the side of the bracket opposite said base portion being formed with sections of inverted U-shaped container whose inner portion receives and supports the receptacle.

References Cited in the file of this patent

UNITED STATES PATENTS

| | | |
|---|---|---|
| 2,085,486 | Villani | June 29, 1937 |
| 2,593,064 | Silberman | Apr. 15, 1952 |
| 2,767,609 | Cousino | Oct. 23, 1956 |